United States Patent
Khoshnevisan et al.

(10) Patent No.: US 10,680,706 B2
(45) Date of Patent: Jun. 9, 2020

(54) TECHNIQUES AND APPARATUSES FOR TIME DIVISION DUPLEX COEXISTENCE CONFIGURATION

(71) Applicant: QUALCOMM Incorporated, San Diego, CA (US)

(72) Inventors: Mostafa Khoshnevisan, San Diego, CA (US); Farhad Meshkati, San Diego, CA (US); Douglas Knisely, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 16/013,790

(22) Filed: Jun. 20, 2018

(65) Prior Publication Data

US 2019/0044614 A1 Feb. 7, 2019

Related U.S. Application Data

(60) Provisional application No. 62/529,869, filed on Aug. 1, 2017.

(51) Int. Cl.
| | |
|---|---|
| H04B 7/26 | (2006.01) |
| H04L 5/14 | (2006.01) |
| H04W 72/08 | (2009.01) |
| H04L 5/00 | (2006.01) |
| H04W 52/24 | (2009.01) |

(Continued)

(52) U.S. Cl.
CPC ............ *H04B 7/2646* (2013.01); *H04L 5/14* (2013.01); *H04L 5/1469* (2013.01); *H04W 52/16* (2013.01); *H04W 52/386* (2013.01); *H04W 72/02* (2013.01); *H04W 72/082* (2013.01); *H04L 5/0005* (2013.01);
(Continued)

(58) Field of Classification Search
CPC .... H04B 7/185; H04W 16/14; H04W 72/048; G01S 19/21
See application file for complete search history.

(56) References Cited

U.S. PATENT DOCUMENTS

| | | | | |
|---|---|---|---|---|
| 2015/0304087 | A1* | 10/2015 | He | H04L 5/0007 370/280 |
| 2019/0069187 | A1* | 2/2019 | Ashrafi | H04W 52/0206 |
| 2019/0261190 | A1* | 8/2019 | Smyth | H04W 16/14 |

OTHER PUBLICATIONS

Dish Network: "CBRS 3.5 GHz band for LTE in the United States", 3GPP Draft; R4-165162, 3 5 GHz CBRS 3.5 GHz Band for LTE in the United States, 3rd Generation Partnership Project (3GPP), Mobile Competence Centre; 650, Route Des Lucioles; F-06921 Sophia Antipolis Cedex, vol. TSG RAN, No. Gothenburg, Sweden; Aug. 22, 2016-Aug. 26, 2016, Aug. 21, 2016 (Aug. 21, 2016), Retrieved from the Internet: URL: http://www.3gpp.org/ftp/Meetings_3GPP_SYNC/RAN4/Docs/ [retrieved on Aug. 21, 2016].

(Continued)

*Primary Examiner* — Iqbal Zaidi
(74) *Attorney, Agent, or Firm* — Anthony R. Morris

(57) ABSTRACT

A method, an apparatus, and a computer program product for wireless communication are provided. The apparatus may receive, for a citizens broadband radio service (CBRS) band, time division duplex (TDD) configuration preferences. The apparatus may select, based at least in part on the TDD configuration preferences, a TDD configuration, from a plurality of possible TDD configurations. The apparatus may transmit selection information identifying the selected TDD configuration.

44 Claims, 10 Drawing Sheets

(51) Int. Cl.
    *H04W 72/04*     (2009.01)
    *H04W 52/38*     (2009.01)
    *H04W 72/02*     (2009.01)
    *H04W 52/16*     (2009.01)

(52) U.S. Cl.
    CPC .......... *H04L 5/0066* (2013.01); *H04L 5/0091* (2013.01); *H04W 52/243* (2013.01); *H04W 72/0446* (2013.01)

(56) References Cited

OTHER PUBLICATIONS

Huawei., et al., "UL Power Control for Cross-Link Interference Mitigation", 3GPP Draft; R1-1709983, 3rd Generation Partnership Project (3GPP), Mobile Competence Centre; 650, Route Des Lucioles; F-06921, Sophia-Antipolis Cedex; France, vol. RAN WG1, No. Qingdao, China; Jun. 27, 2017-Jun. 30, 20170630, Jun. 26, 2017 (Jun. 26, 2017), 6 pages, XP051299208, Retrieved from the Internet: URL: http://www.3gpp.org/ftp/Meetings_3GPP_SYNC/RAN1/Docs/ [retrieved on Jun. 26, 2017].

International Search Report and Written Opinion—PCT/US2018/040772—ISA/EPO—dated Oct. 10, 2018.

Mediatek Inc: "Interference Management of TDD eiMTA", 3GPP Draft; R1-131175, Interference Management of TDD EIMTA, 3rd Generation Partnership Project (3GPP), Mobile Competence Centre, 650, Route Des Lucioles, F-06921 Sophia-Antipolis Cedex, France, vol. RAN WG1, No. Chicago, USA; Apr. 15, 2013-Apr. 19, 2013, Apr. 6, 2013 (Apr. 6, 2013), XP050697093, 4 pages, Retrieved from the Internet: URL: http://www.3gpp.org/ftp/tsg_ran/VVG1_RL1/TSGR1_72b/Docs/ [retrieved on Apr. 6, 2013].

\* cited by examiner

TECHNIQUES AND APPARATUSES FOR TIME DIVISION DUPLEX COEXISTENCE CONFIGURATION

CROSS-REFERENCE TO RELATED APPLICATIONS UNDER 35 U.S.C. § 119

This application claims priority to Provisional Patent Application No. 62/539,869, filed on Aug. 1, 2017, entitled "TECHNIQUES AND APPARATUSES FOR TIME DIVISION DUPLEX COEXISTENCE CONFIGURATION," which is hereby expressly incorporated by reference herein.

BACKGROUND

Field

The present disclosure relates generally to communication systems, and more particularly, to techniques and apparatuses for time division duplex (TDD) configuration.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, an apparatus, and a computer program product are provided.

In some aspects, the method may include receiving, by a network management device for a citizens broadband radio service (CBRS) band, time division duplex (TDD) configuration preferences. The method may include selecting, by the network management device and based at least in part on the TDD configuration preferences, a TDD configuration, from a plurality of possible TDD configurations. The method may include transmitting, by the network management device, selection information identifying the selected TDD configuration.

In some aspects, the apparatus may include a memory and at least one processor coupled to the memory. The memory and the at least one processor may be configured to receive, for a CBRS band, TDD configuration preferences. The memory and the at least one processor may be configured to select, based at least in part on the TDD configuration preferences, a TDD configuration, from a plurality of possible TDD configurations. The memory and the at least one processor may be configured to transmit selection information identifying the selected TDD configuration.

In some aspects, the apparatus may include means for receiving, for a CBRS band, TDD configuration preferences. The apparatus may include means for selecting, based at least in part on the TDD configuration preferences, a TDD configuration, from a plurality of possible TDD configurations. The apparatus may include means for transmitting selection information identifying the selected TDD configuration.

In some aspects, the computer program product may include a non-transitory computer-readable medium storing computer executable code. The code may include code for receiving, for a CBRS band, TDD configuration preferences. The code may include code for selecting, based at least in part on the TDD configuration preferences, a TDD configuration, from a plurality of possible TDD configurations. The code may include code for transmitting selection information identifying the selected TDD configuration.

Aspects generally include a method, apparatus, system, computer program product, non-transitory computer-readable medium, processing system, user equipment, citizens broadband service device, coexistence management device, network management device, eNB, and base station as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
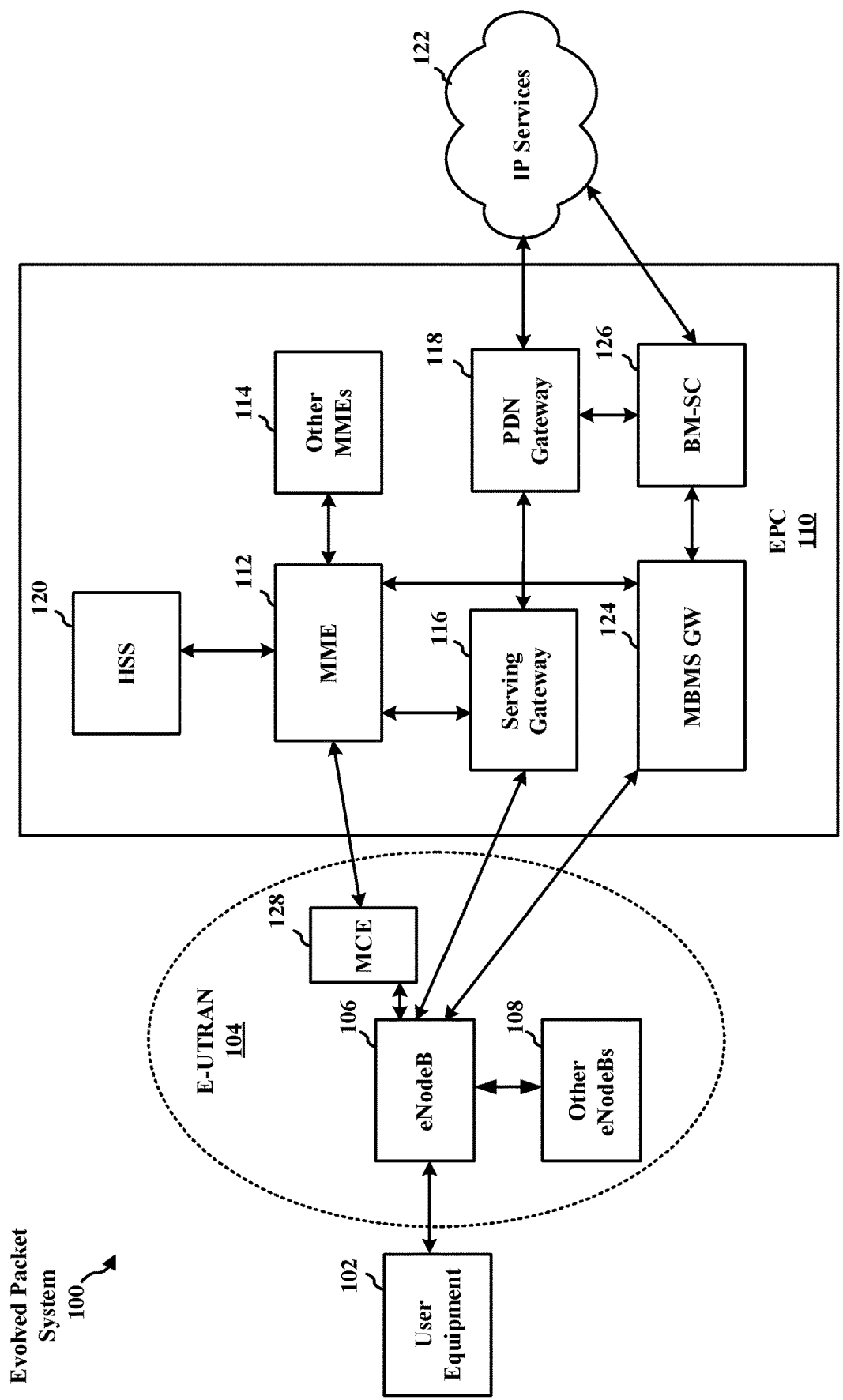
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BS S), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

FIG. 1 is provided as an example. Other examples are possible and may differ from what was described in connection with FIG. 1.

Figure 2:
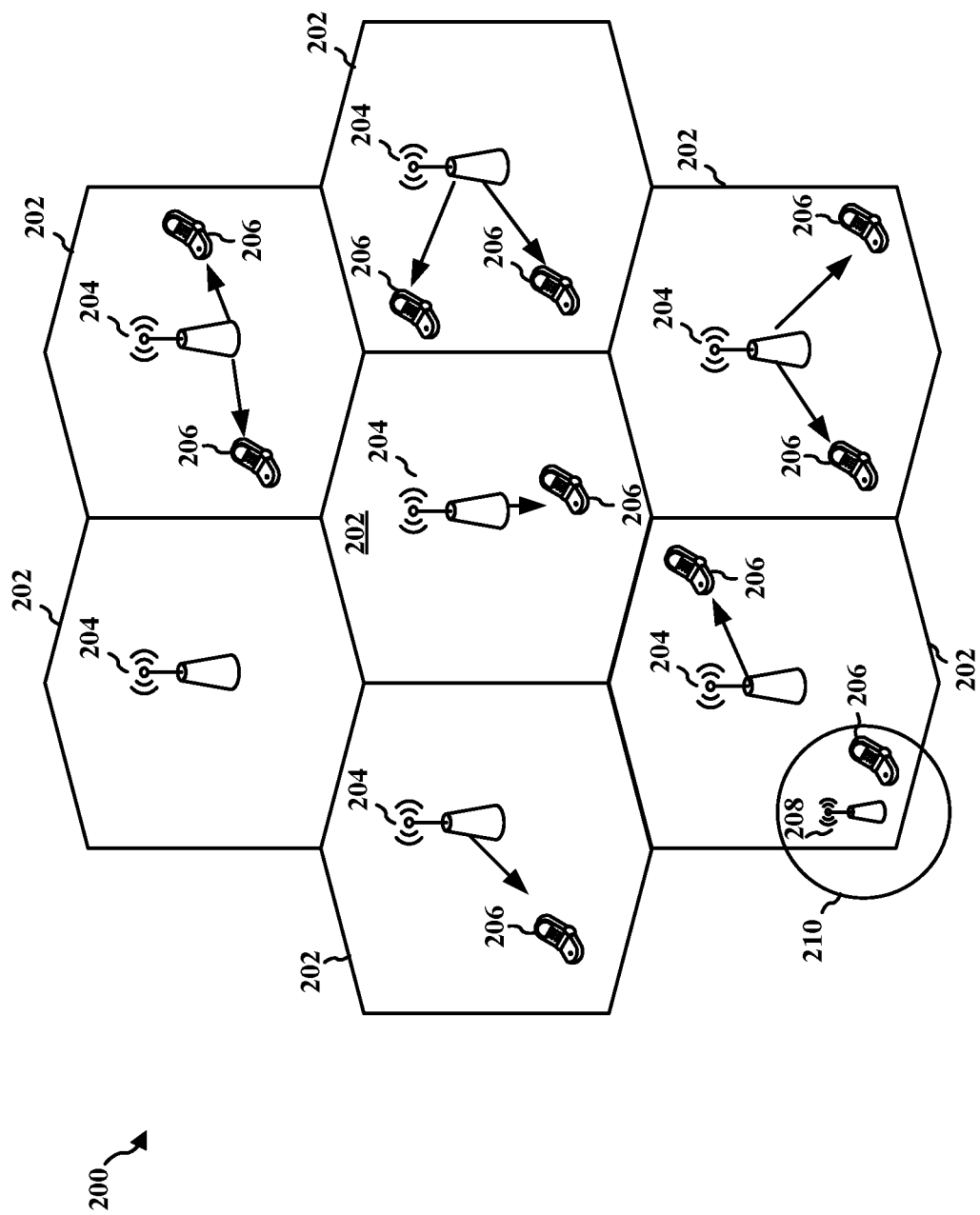
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

FIG. 2 is provided as an example. Other examples are possible and may differ from what was described in connection with FIG. 2.

Figure 3:
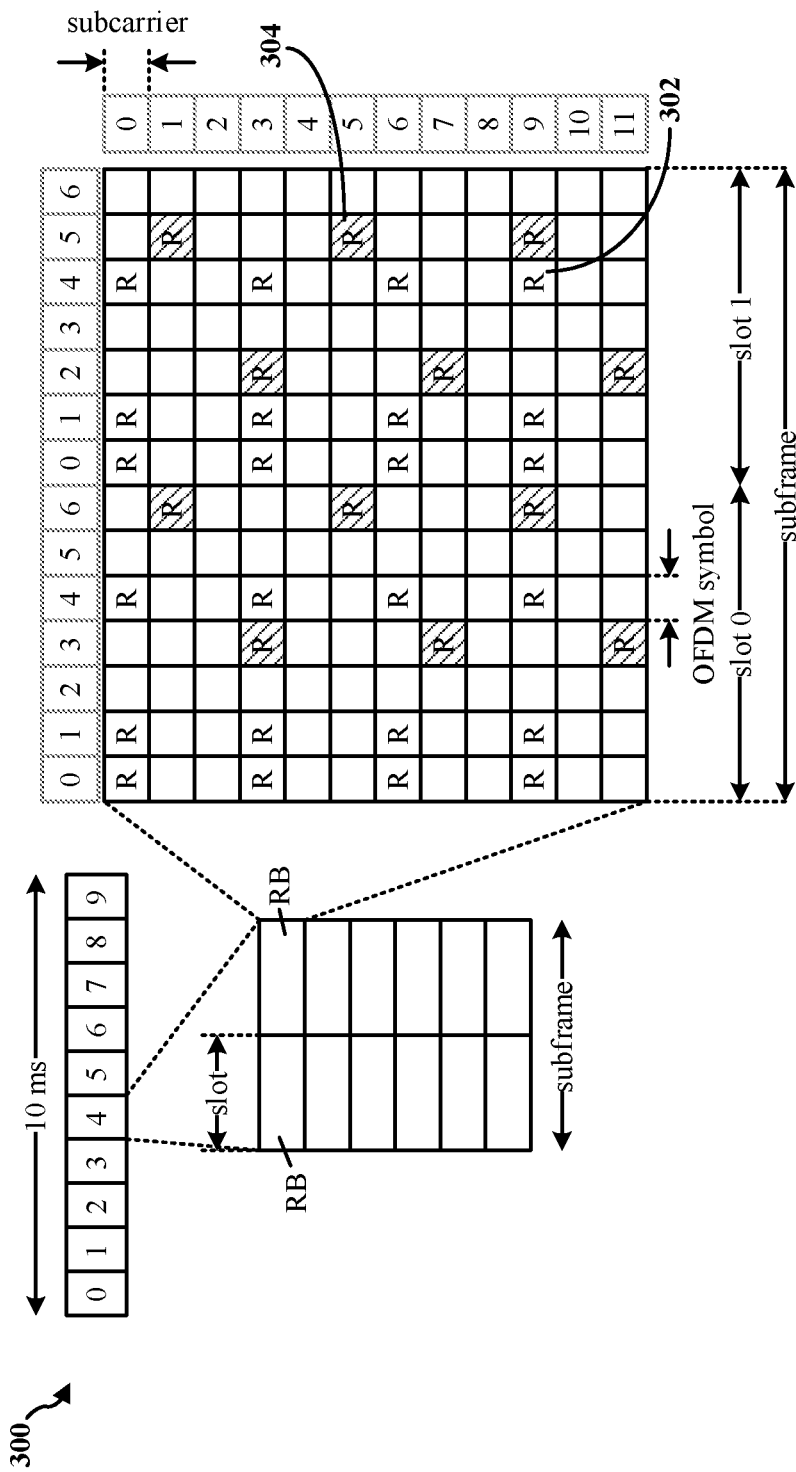
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

FIG. 3 is provided as an example. Other examples are possible and may differ from what was described in connection with FIG. 3.

Figure 4:
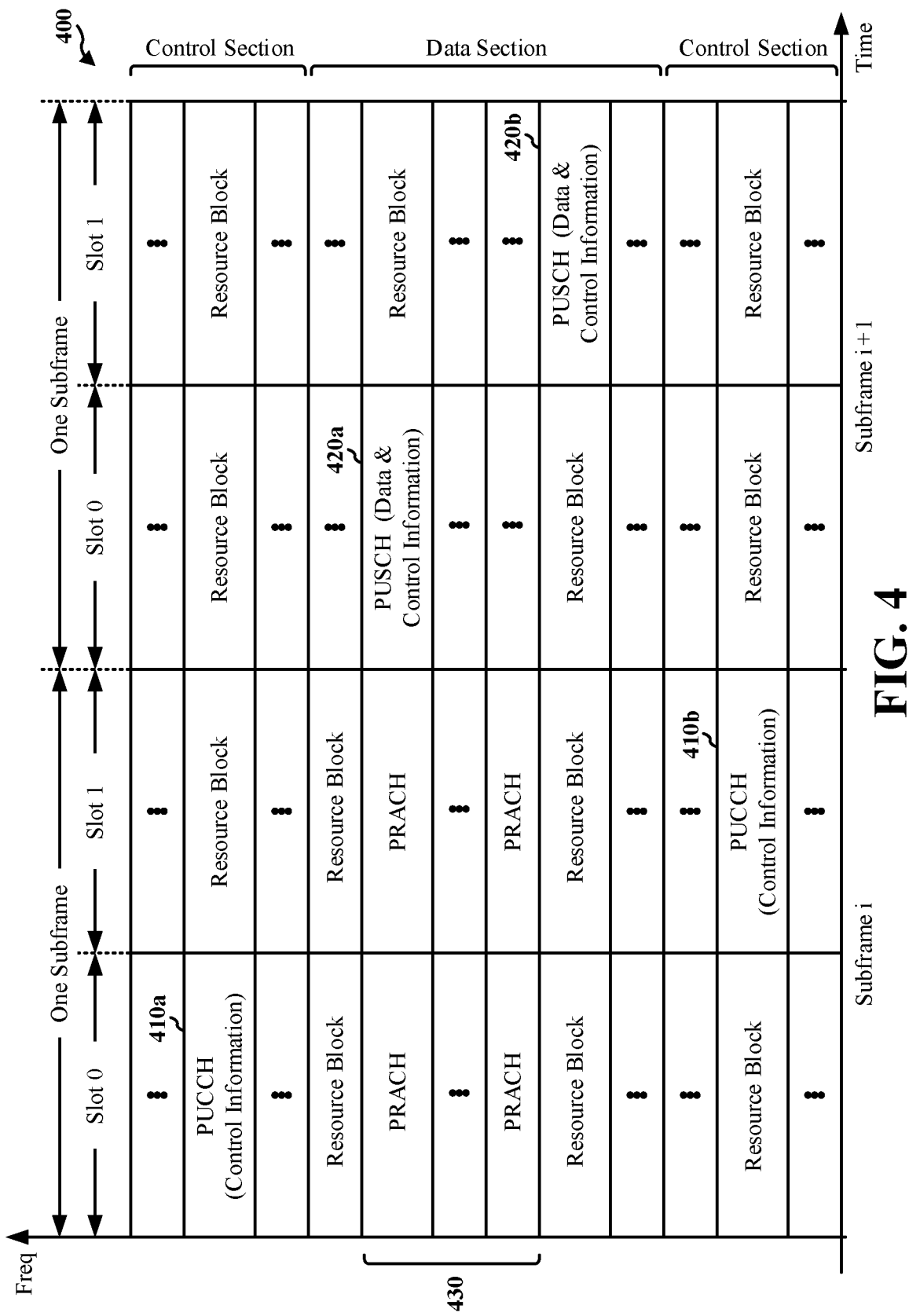
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

FIG. 4 is provided as an example. Other examples are possible and may differ from what was described in connection with FIG. 4.

Figure 5:
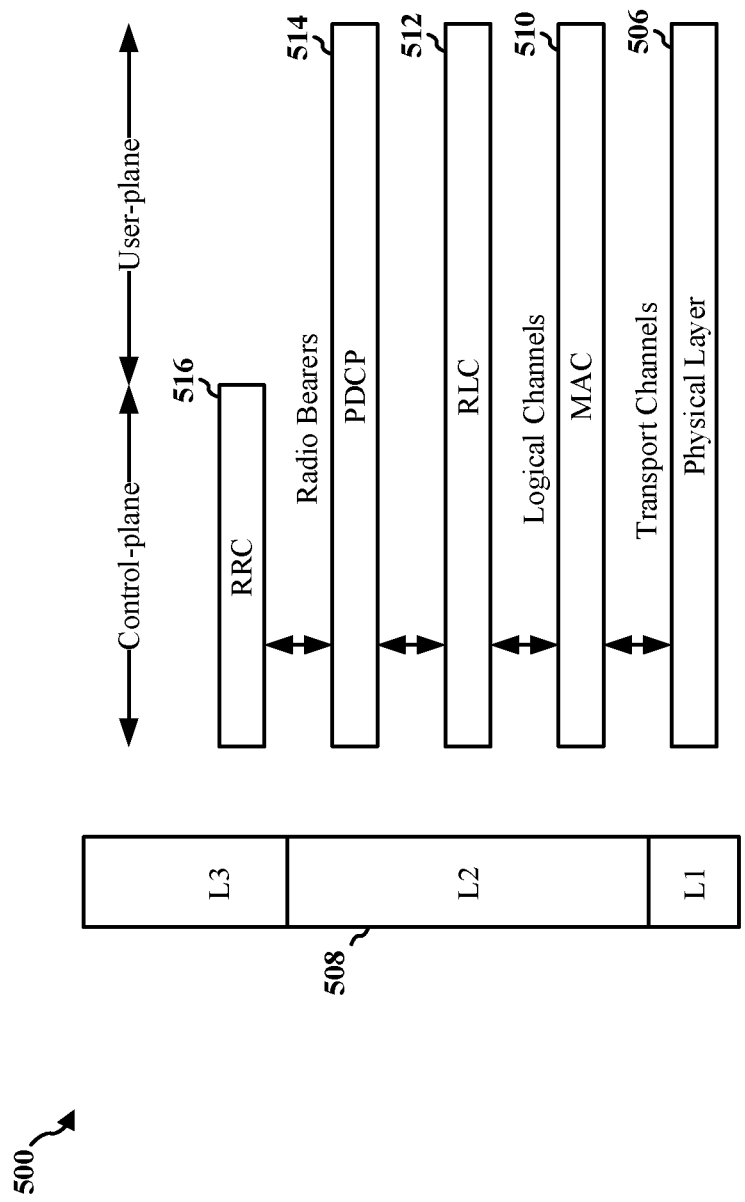
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) sublayer 514, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

FIG. 5 is provided as an example. Other examples are possible and may differ from what was described in connection with FIG. 5.

Figure 6:
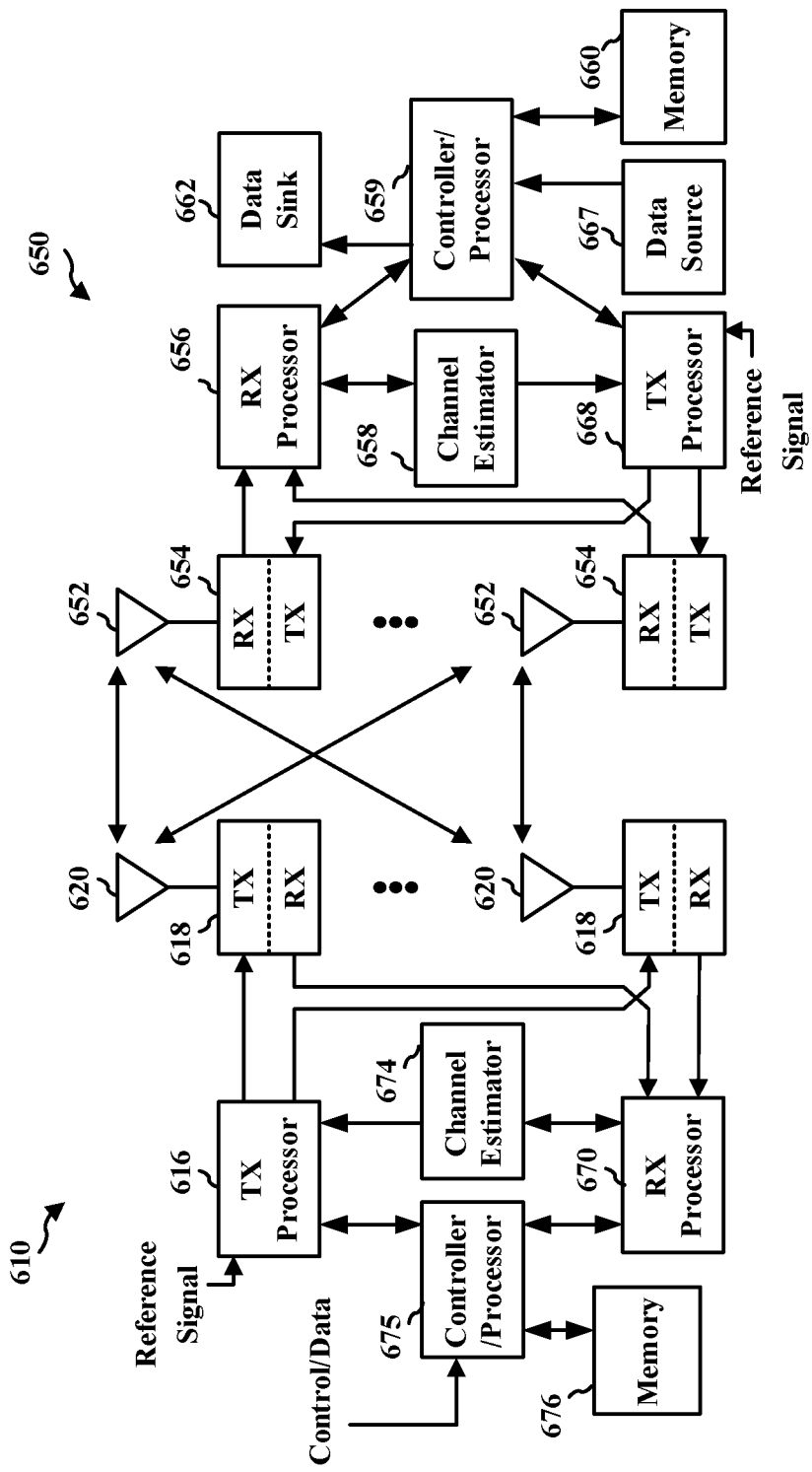
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based at least in part on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based at least in part on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based at least in part on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based at least in part on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Controller/processor 675 of eNB 610, controller/processor 659 of UE 650, and/or any other component(s) of FIG. 6 may perform one or more techniques associated with TDD coexistence configuration, as described in more detail elsewhere herein. For example, controller/processor 675 of eNB 610, controller/processor 659 of UE 650, and/or any other component(s) of FIG. 2 may perform or direct operations of, for example, method 800 of FIG. 8 and/or other processes as described herein. Memories 676 and 660 may store data and program codes for eNB 610 and UE 650, respectively.

FIG. 6 is provided as an example. Other examples are possible and may differ from what was described in connection with FIG. 6.

Citizens broadband radio service (CBRS) may be deployed using time division duplex (TDD) for sharing network resources. In a CBRS-based network, an network management device (e.g., a coexistence management device (CxM)) providing coexistence management for a CBRS band) may utilize a predefined TDD configuration (i.e., a TDD coexistence configuration) to assign subframes for uplink (UL) transmission, downlink (DL) transmission, and/ or the like. For example, CBRS is configured to utilize 3GPP TS 36.211 Uplink-Downlink Configuration 2 with an UL:DL ratio of subframes of 2:6.

It is noted that while aspects may be described herein using terminology commonly associated with 3G and/or 4G wireless technologies, aspects of the present disclosure can be applied in other generation-based communication systems, such as 5G and later, including 5G technologies. Thus, although some aspects, described herein, are described in terms of 3GPP TS 36.211 and LTE technology, aspects, described herein may be utilized in terms of other uplink-downlink configurations and other technologies, such as 5G technology (sometimes termed New Radio (NR) technology) and/or the like.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

The network management device may perform primary channel assignment and may allocate bandwidth for intra-general authorized access (intra-GAA) coexistence of user equipment (UEs) (e.g., citizens broadband service devices (CBSDs)) using a CBRS band. The network management device may assign overlapping networks or interference coordination groups (ICGs) to orthogonal channels. When networks are time synchronized using a common TDD configuration (i.e., Configuration 2), a guard band may not need to be allocated, thereby improving utilization of network resources for UL and DL.

However, the configured TDD configuration (i.e., Configuration 2) may be associated with an UL:DL ratio that does not match a traffic utilization by a group of UEs. For example, some types of UEs may be associated with a balanced (e.g., 4:4 that, for subframes 0-9, is associated with a D-S-U-U-D-D-S-U-U arrangement, wherein D represents downlink, U represents uplink, and S represents a spacing) UL:DL ratio. Alternatively, other types of UEs (e.g., Internet of Things (IoT) UEs) may be associated with an UL-preferred (e.g., 2:6 that, for subframes 0-9, is associated with a D-S-U-D-D-D-S-U-D-D arrangement) UL:DL ratio. Thus, the configured TDD configuration may result in poor utilization of network resources by over-allocating network resources to UL traffic or to DL traffic, under-allocating network resources to UL traffic or to DL traffic, and/or the like.

Some aspects, described herein, may provide TDD configuration (e.g., TDD coexistence configuration) for a CBRS band. For example, some aspects, described herein, may enable a network management device to select from multiple possible TDD configurations based at least in part on TDD configuration preferences of UEs using the CBRS band. In this way, the network management device may enable more efficient utilization of network resources relative to allocating network resources based at least in part on a single configured TDD configuration and without accounting for preferences of UEs utilizing the CBRS band.

Figure 7:
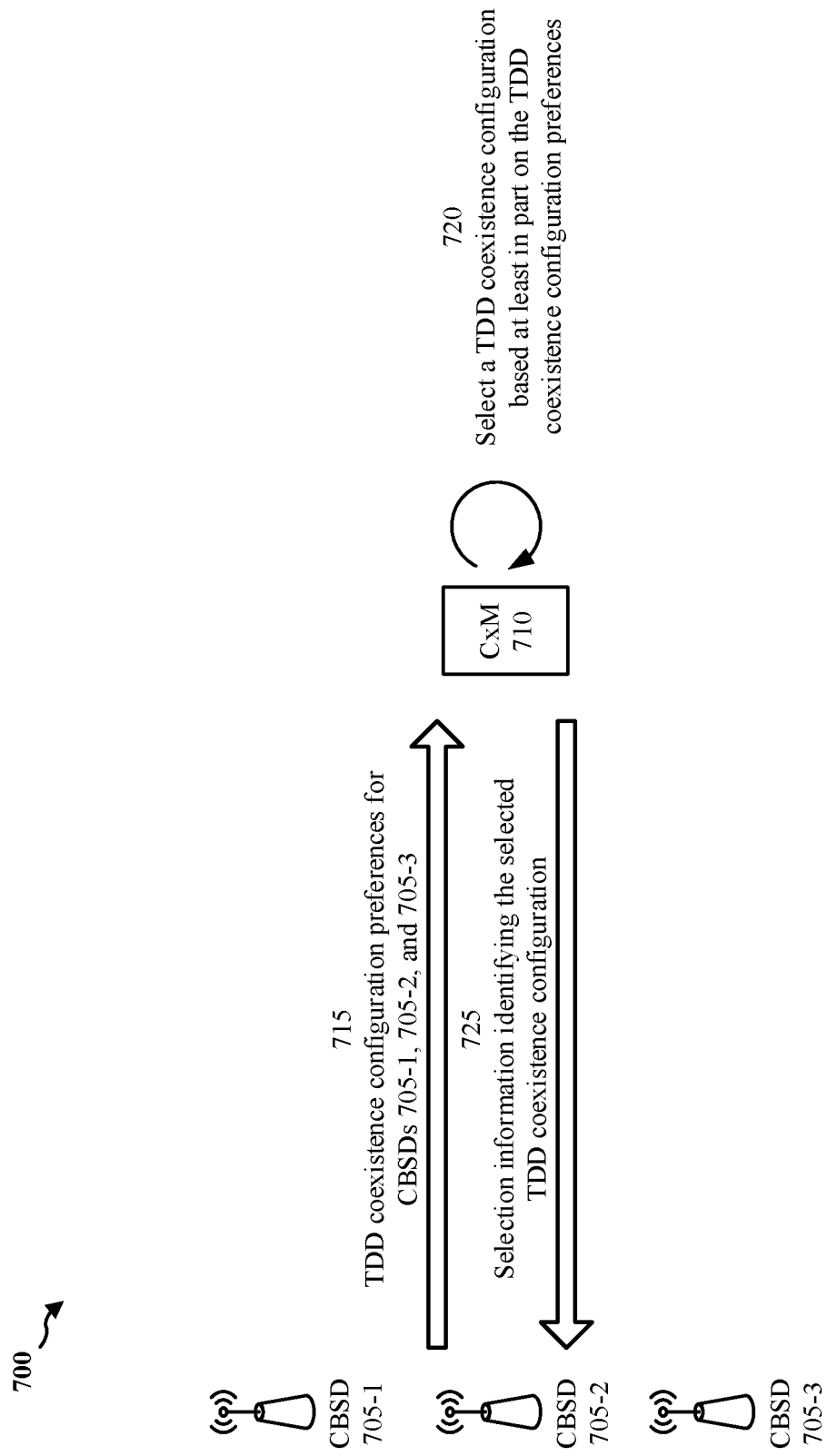
FIG. 7 is a diagram illustrating time division duplex (TDD) configuration for a citizens broadband radio service (CBRS) band.

FIG. 7 is a diagram illustrating an example 700 of TDD configuration for a CBRS band. As shown in FIG. 7, example 700 may include CBSDs 705-1, 705-2, and 705-3 (hereinafter referred to individually as "CBSD 705," and collectively as "CBSDs 705"), which may be UEs, and CxM 710, which may be a network management device.

As shown by reference number 715, CxM 710 may receive TDD configuration preferences from CBSDs 705. For example, CxM 710 may receive a registration message when a CBSD 705 is registering for the CBRS band, and the registration message may include a parameter identifying a preferred TDD configuration (e.g., corresponding to a use case of the CBSD, such as a balanced UL:DL use case, a UL-preferred (IoT) use case, and/or the like). In some aspects, the possible TDD configurations may be coexistence configurations defined by 3GPP TS 36.211. For example, CxM 710 may support 3GPP TS 36.211 UL-DL Configuration 0, Configuration 1, and/or Configuration 2. In some aspects, the possible TDD configurations may be coexistence configurations used for 5G or another radio technology.

In some aspects, CxM 710 may support only three possible TDD configurations, thereby reducing a likelihood that multiple different TDD configurations are deployed for a particular area. In this case, CxM 710 may be associated with a fixed special subframe configuration (SSF) (i.e., SSF Configuration 7) for each of the three possible TDD configurations. In some aspects, CxM 710 may receive a TDD configuration preference identifying a preferred TDD configuration not included in the possible TDD configurations (e.g., the preferred TDD configuration is not supported by CxM 710). In this case, CxM 710 may select a possible TDD configuration for deployment that is associated with an UL:DL ratio closest to an UL:DL ratio of the preferred TDD configuration relative to other possible TDD configurations.

As shown by reference number 720, CxM 710 may select a TDD configuration based at least in part on the TDD configuration preferences. For example, when each CBSD 705 (e.g., each CBSD 705 of a single network, of a single ICG, of a single spectrum access system (SAS) connected set, and/or the like) indicates a TDD configuration preference of a common TDD configuration, CxM 710 may select the common TDD configuration as the selected TDD configuration. Alternatively, when at least one CBSD 705 indicates a different preferred TDD configuration than at least one other CBSD 705 (e.g., of a common network, of a common ICG, of a common SAS connected set, and/or the like), CxM 710 may select a compromise TDD configuration as the selected TDD configuration.

In some aspects, CxM 710 may determine the compromise TDD configuration based at least in part on an average of UL:DL ratios of preferred TDD configurations identified by CBSDs 705. For example, CxM 710 may determine an average UL:DL ratio based at least in part on the UL:DL ratios of the preferred TDD configurations, and may determine a possible TDD configuration associated with an UL:DL ratio closest to the average UL:DL ratio relative to UL:DL ratios of other possible TDD configurations. In some aspects, CxM 710 may determine the average UL:DL ratio on a per CBSD basis. For example, CxM 710 may average each UL:DL ratio preferred by each CBSD 705. Additionally, or alternatively, CxM 710 may determine the average UL:DL ratio on a per ICG or per network basis. For example, CxM 710 may average each UL:DL ratio preferred by each ICG.

In some aspects, CxM 710 may determine multiple candidate TDD configurations. For example, CxM 710 may determine the compromise TDD configuration as a candidate TDD configuration and a preferred TDD configuration as a candidate TDD configuration. In this case, CxM 710 may provide selection information identifying each candidate TDD configuration, may receive, from a CBSD 705, response information as a response to the selection information that identifies one of the candidate TDD configurations, and may configure the selected candidate TDD configuration for the CBSD 705.

As shown by reference number 725, CxM 710 may transmit selection information to CBSDs 705 identifying the selected TDD configuration. For example, when the selected TDD configuration is the preferred TDD configuration of the CBSDs 705, CxM 710 may provide selection information associated with the preferred TDD configuration. Additionally, or alternatively, when the selected TDD configuration is a compromise TDD configuration, CxM 710 may provide selection information associated with the compromise TDD configuration.

In some aspects, the selection information may include information identifying multiple candidate TDD configurations. For example, CxM 710 may provide a spectrum enquiry that identifies the compromise TDD configuration and a first corresponding primary channel allocation and a preferred TDD configuration and a second corresponding primary channel allocation. In this case, the second corresponding primary channel allocation may be associated with a transmission power reduction to avoid co-channel interference for a CBSD 705 with other CBSDs 705 corresponding to a same color (e.g., frequency band). Similarly, the second corresponding primary channel allocation may be associated with a guard band allocation to avoid adjacent channel interference for a CBSD 705 with other CBSDs 705 corresponding to different colors. In this way, a CBSD 705 may be enabled to select the compromise TDD configuration determined by CxM 710 or the preferred TDD configuration CBSD 705, which may be associated with a network resource allocation penalty (e.g., the transmission power reduction and/or the guard band allocation).

In some aspects, CxM 710 may determine the transmission power reduction for CBSD 705, and may provide selection information identifying the transmission power. For example, CxM 710 may determine a color for a CBSD 705, and may identify other CBSDs 705 associated with another ICG and with the same color as the CBSD 705. In this case, CxM 710 may determine the transmission power reduction based at least in part on a separation metric for co-channel allocations between the CBSD 705 and the other CBSDs 705. In some aspects, the separation metric may be a pathloss metric or a power metric associated with interference avoidance for the co-channel allocations. In some aspects, CxM 710 may determine adjacent channel interference for CBSD 705. In some aspects, CxM 710 may determine a guard band allocation for CBSD 705, and may provide selection information identifying the guard band allocation. For example, CxM 710 may determine other CBSDs 705 with primary channels with frequency blocks adjacent to primary channel frequency blocks for the CBSD 705 and may determine a guard band metric. In this case, CxM 710 may allocate the guard band based at least in part on the guard band metric and the frequency blocks to avoid adjacent channel interference. In some aspects, the guard band metric may be a pathloss separation associated with avoiding adjacent channel interference with other CBSDs 705 associated with the frequency blocks adjacent to the primary channel frequency blocks.

As indicated above, FIG. 7 is provided as an example. Other examples are possible and may differ from what was described with respect to FIG. 7.

Figure 8:
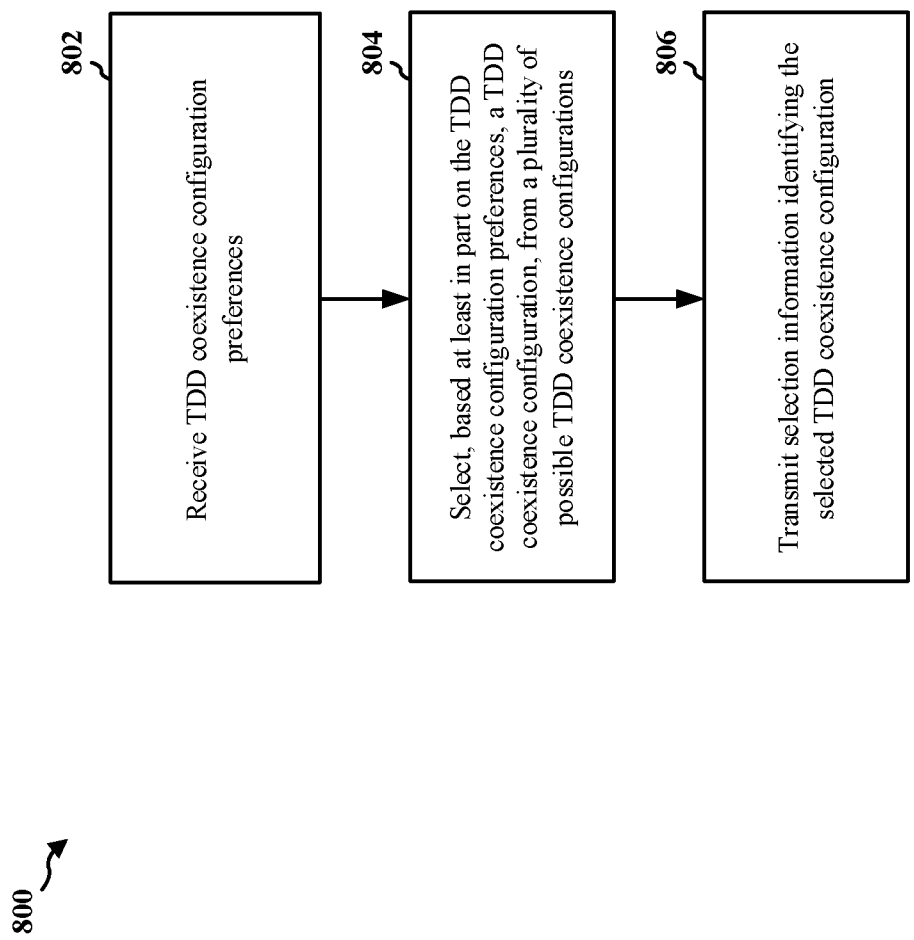
FIG. 8 is a flow chart of a method of wireless communication.

FIG. 8 is a flow chart of a method 800 of wireless communication. The method may be performed by a network management device for a CBRS band (e.g., a component of or operating in association with the eNB 106, the eNB 204, the eNB 208, the eNB 610; the CxM 710; the apparatus 902/902'; and/or the like).

At 802, the network management device may receive TDD configuration preferences. For example, the network management device (e.g., using antenna 620, receiver 618, receive processor 670, controller/processor 675, and/or the like) may receive TDD configuration preferences from citizens broadband service devices (CBSDs) (e.g., the eNB 106, the eNB 204, the eNB 208, the eNB 610, CBSD 705, CBSD 950, and/or the like), as described above. In some aspects, a TDD configuration preference, of the TDD configuration preferences, is received via a parameter of a registration message during spectrum access system (SAS) registration or coexistence manager (CxM) registration.

At 804, the network management device may select, based at least in part on the TDD configuration preferences, a TDD configuration, from a plurality of possible TDD configurations. For example, the network management device (e.g., using controller/processor 675 and/or the like) may select the TDD configuration from the plurality of possible TDD configurations based at least in part on the TDD configuration preferences, as described above. In some aspects, the possible TDD configurations include a plurality of uplink-downlink configurations. In some aspects, the uplink-downlink configurations include 3GPP TS 36.211 uplink-downlink (UL-DL) configurations 0, 1, and 2.

In some aspects, each TDD configuration preference, of the TDD configuration preferences, identifies a common TDD configuration, and the selected TDD configuration is the common TDD configuration.

In some aspects, two or more TDD configuration preferences, of the TDD configuration preferences, do not identify a common TDD configuration, and the selected TDD configuration is a compromise TDD configuration. In some aspects, the compromise TDD configuration is determined based at least in part on an average of uplink/downlink (UL:DL) ratios of the TDD configuration preferences. In some aspects, the compromise TDD configuration is associated with an UL:DL ratio closest, of the possible TDD configurations, to the average. In some aspects, the average is determined on a per CBSD basis or a per network basis. In some aspects, the selection information identifies the compromise TDD configuration associated with a first primary channel allocation for a CBSD and a TDD configuration preference initially indicated by the CBSD, of the possible TDD configurations and determined based at least in part on the TDD configuration preferences, associated with a second primary channel allocation for the CBSD, and the second primary channel allocation is associated with a guard band allocation and a transmission power reduction relative to a transmission power of the first primary channel allocation.

At 806, the network management device may transmit selection information identifying the selected TDD configuration. For example, the network management device (e.g., using controller/processor 675, transmit processor 616, transmitter 618, antenna 620, and/or the like) may transmit the selection information (e.g., to a CBSD) to identify the selected TDD configuration and to enable a CBSD to communicate based at least in part on the selected TDD configuration, as described above.

In some aspects, the selected TDD configuration is a TDD coexistence configuration. In some aspects, a primary channel is assigned for a CBSD of the CBRS band based at least in part on response information identifying a TDD configuration; and the response information is received as a response to the selection information. In some aspects, a transmission power reduction for a primary channel, assigned for a CBSD of the CBRS band, is determined based at least in part on the selected TDD configuration and a separation metric to avoid harmful interference with CBSDs with co-channel allocations. In some aspects, a guard band for a primary channel, assigned for a CBSD of the CBRS band, is determined based at least in part on the selected TDD configuration and at least one of: a primary channel frequency block assignment for the CBSD, primary channel frequency block assignments of other CBSDs, a guard band metric to avoid harmful adjacent channel interference, a separation metric, or a transmission power reduction.

Method 800 may include additional aspects, such as any single aspect or any combination of aspects described above and/or in connection with one or more other processes described elsewhere herein.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
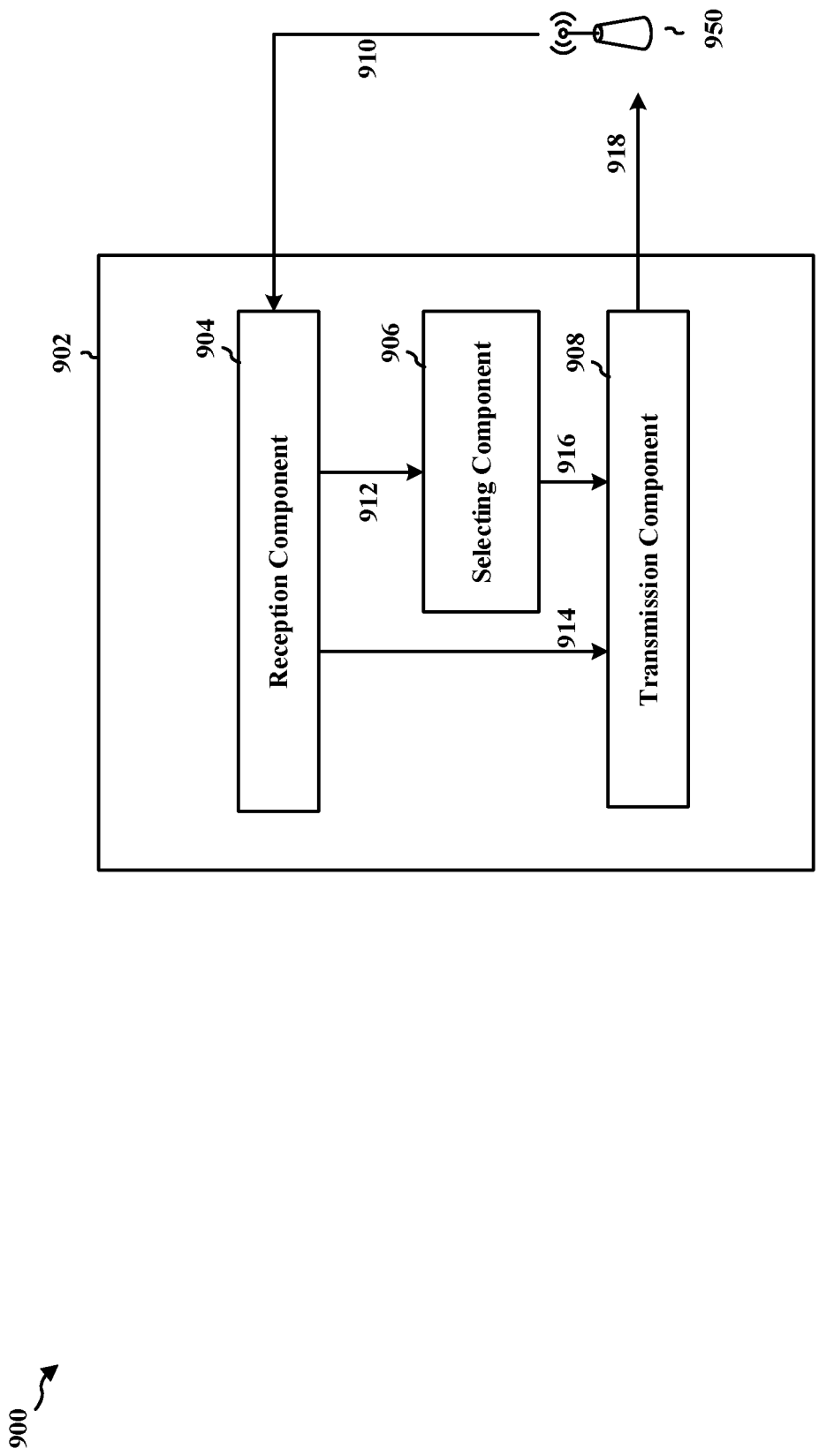
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus 902 may be a network management device (e.g., a CxM). In some aspects, the apparatus 902 includes a reception component 904, a selecting component 906, and/or a transmission component 908

The reception component 904 may receive data 910 from one or more CBSDs 950. For example, the reception component 904 may receive data 910 from the CBSD 950 indicating a TDD configuration preference for the CBSD. In some aspects, the reception component 904 may receive TDD configuration preferences via a parameter of a registration message. For example, when the CBSD 950 performs spectrum access system (SAS) registration with an SAS or coexistence manager (CxM) registration with a CxM (e.g., the apparatus 902), the CBSD 950 may transmit, to the reception component 904, a registration message including a parameter identifying a 3GPP TS 36.211 UL-DL configuration, such as configuration 0, configuration 1, configuration 2, and/or the like, or a UL-DL configuration associated with another radio technology, such as 5G. In some aspects, the reception component 904 may receive a response to a spectrum enquiry indicating a selection of a compromise TDD configuration and a preferred TDD configuration.

The selecting component 906 may receive data 912 from the reception component 904. For example, the selecting component 906 may receive data 912 indicating TDD configuration preferences for CBSDs 950 of a CBRS band, and may select a TDD configuration, from a plurality of possible TDD configurations, based at least in part on the TDD configuration preferences. In some aspects, the selecting component 906 may select a preferred TDD configuration. For example, based at least in part on each CBSD 950 (e.g., of a common network, a common ICG, a common SAS connected set, and/or the like) indicating a common preferred TDD configuration, selecting component 906 may select the common preferred TDD configuration. Additionally, or alternatively, based at least in part on at least one CBSD 950 indicating a different preferred TDD configuration than at least one other CBSD 950 (e.g., of a common network, a common ICG, a common SAS connected set, and/or the like), selecting component 906 may select a compromise TDD configuration. In some aspects, selecting component 906 may select the compromise TDD configuration and the preferred TDD configuration, and may transmit a spectrum enquiry to enable the CBSD 950 to select from the compromise TDD configuration and the preferred TDD configuration.

The transmission component 908 may receive data 914 from the reception component 904 and data 916 from the selecting component 906. For example, the transmission component 908 may receive data 916 identifying a selected TDD configuration, such as a preferred TDD configuration, a compromise TDD configuration, and/or the like. In this case, the transmission component 908 may transmit data 918 to the CBSD 950. For example, the transmission component 908 may transmit data 918 identifying the selected TDD configuration. In some aspects, the transmission component 908 may transmit data 918 indicating a primary channel allocation, a transmission power reduction, or a guard band allocation for the CBSD 950 based at least in part on the selected TDD configuration. In some aspects, the transmission component 908 may transmit a spectrum enquiry to enable the CBSD 950 to select from a compromise TDD configuration and a preferred TDD configuration. In some aspects, the transmission component 908 may transmit information based at least in part on a response to the spectrum enquiry, such as information identifying a primary channel allocation associated with a selection performed as a response to the spectrum enquiry.

The apparatus may include additional components that perform each of the blocks of the algorithm in the aforementioned flow chart of FIG. 8. As such, each block in the aforementioned flow chart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
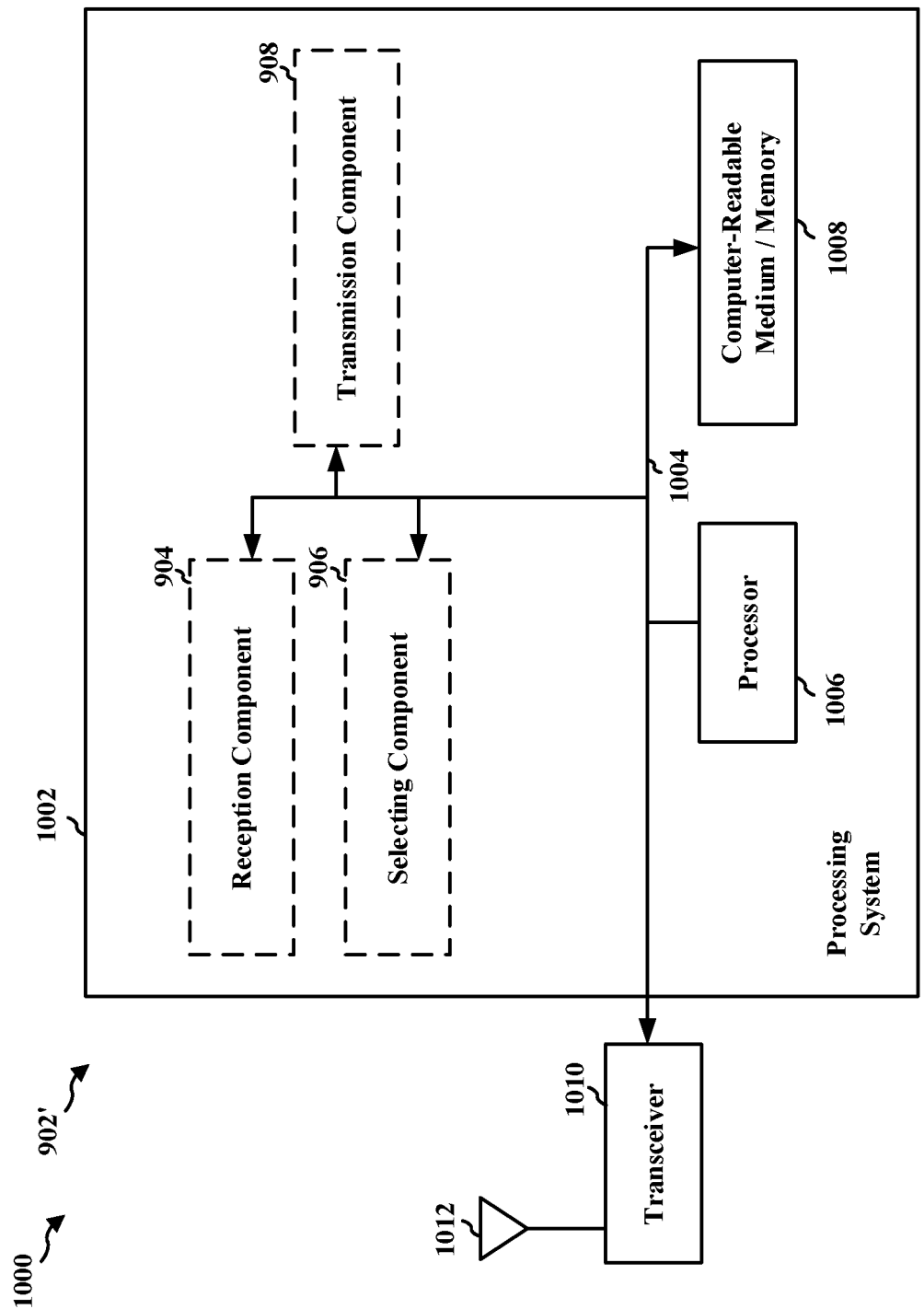
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be a network management device (e.g., a CxM).

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware components, represented by the processor 1006, the components 904, 906, 908, and the computer-readable medium/memory 1008. The bus 1004 may also link various other circuits such as timing sources, peripherals, voltage regulators, and power management circuits, which are well known in the art, and therefore, will not be described any further.

The processing system 1002 may be coupled to a transceiver 1010. The transceiver 1010 is coupled to one or more antennas 1012. The transceiver 1010 provides a means for communicating with various other apparatus over a transmission medium. The transceiver 1010 receives a signal from the one or more antennas 1012, extracts information from the received signal, and provides the extracted information to the processing system 1002, specifically the reception component 904. In addition, the transceiver 1010 receives information from the processing system 1002, specifically the transmission component 908, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described supra for any particular apparatus. The computer-readable medium/memory 1008 may also be used for storing data that is manipulated by the processor 1006 when executing software. The processing system further includes at least one of the components 904, 906, and 908. The components may be software components running in the processor 1006, resident/stored in the computer readable medium/memory 1008, one or more hardware components coupled to the processor 1006, or some combination thereof. The processing system 1002 may be a component of the eNB 610 and may include the memory 676 and/or at least one of the TX processor 616, the RX processor 670, and/or the controller/processor 675. Additionally, or alternatively, the processing system 1002 may be a component of a CxM, which is separate from eNB 610, and that includes a memory, a processor, a controller, and/or the like.

In some aspects, the apparatus 902/902' for wireless communication includes means for receiving, for a citizens broadband radio service (CBRS) band, time division duplex (TDD) configuration preferences; means for selecting, based at least in part on the TDD configuration preferences, a TDD configuration, from a plurality of possible TDD configurations; and means for transmitting selection information identifying the selected TDD configuration. The aforementioned means may be one or more of the aforementioned components of the apparatus 902 and/or the processing system 1002 of the apparatus 902' configured to perform the functions recited by the aforementioned means. As described supra, the processing system 1002 may include the TX processor 616, the RX processor 670, and the controller/processor 675. As such, in one configuration, the aforementioned means may be the TX processor 616, the RX processor 670, and the controller/processor 675 configured to perform the functions recited by the aforementioned means.

FIG. 10 is provided as an example. Other examples are possible and may differ from what was described in connection with FIG. 10.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving, by a network management device for a citizens broadband radio service (CBRS) band, time division duplex (TDD) configuration preferences;
selecting, by the network management device and based at least in part on the TDD configuration preferences, a TDD configuration, from a plurality of possible TDD configurations; and
transmitting, by the network management device, selection information identifying the selected TDD configuration,
wherein a transmission power reduction or a guard band for a primary channel, assigned for a citizens broadband service device (CBSD) of the CBRS band, is determined based at least in part on the selected TDD configuration and a separation metric.

2. The method of claim 1, wherein the plurality of possible TDD configurations include a plurality of uplink-downlink configurations.

3. The method of claim 2, wherein the plurality of uplink-downlink configurations include 3GPP TS 36.211 uplink-downlink (UL-DL) configurations 0, 1, and 2.

4. The method of claim 1, wherein a TDD configuration preference, of the TDD configuration preferences, is received via a parameter of a registration message during spectrum access system (SAS) registration or coexistence manager (CxM) registration.

5. The method of claim 1, wherein each TDD configuration preference, of the TDD configuration preferences, identifies a common TDD configuration; and
wherein the selected TDD configuration is the common TDD configuration.

6. The method of claim 1, wherein two or more TDD configuration preferences, of the TDD configuration preferences, do not identify a common TDD configuration; and
wherein the selected TDD configuration is a compromise TDD configuration.

7. The method of claim 6, wherein the compromise TDD configuration is determined based at least in part on an average of uplink/downlink (UL:DL) ratios of the TDD configuration preferences.

8. The method of claim 7, wherein the compromise TDD configuration is associated with an UL:DL ratio closest, of the plurality of possible TDD configurations, to the average.

9. The method of claim 7, wherein the average is determined on a per citizens broadband service device (CBSD) basis or a per network basis.

10. The method of claim 6, wherein the selection information identifies the compromise TDD configuration associated with a first primary channel allocation for a citizens broadband service device (CBSD) and a TDD configuration preference initially indicated by the CBSD, of the plurality of possible TDD configurations and determined based at least in part on the TDD configuration preferences, associated with a second primary channel allocation for the CBSD.

11. The method of claim 1, wherein the selected TDD configuration is a TDD coexistence configuration.

12. The method of claim 1, wherein the primary channel is assigned for the CBSD of the CBRS band based at least in part on response information identifying a TDD configuration; and wherein the response information is received as a response to the selection information.

13. The method of claim 1, wherein the transmission power reduction for the primary channel is determined based at least in part on the selected TDD configuration and the separation metric to avoid harmful interference with CBSDs with co-channel allocations.

14. The method of claim 1, wherein the guard band for the primary channel is determined based at least in part on the selected TDD configuration and the separation metric.

15. An apparatus for wireless communication, comprising:
a memory; and
at least one processor coupled to the memory, the memory and the at least one processor configured to:
receive, for a citizens broadband radio service (CBRS) band, time division duplex (TDD) configuration preferences;
select, based at least in part on the TDD configuration preferences, a TDD configuration, from a plurality of possible TDD configurations; and
transmit selection information identifying the selected TDD configuration,
wherein a transmission power reduction or a guard band for a primary channel, assigned for a citizens broadband service device (CBSD) of the CBRS band, is determined based at least in part on the selected TDD configuration and a separation metric.

16. The apparatus of claim 15, wherein the plurality of possible TDD configurations include a plurality of uplink-downlink configurations.

17. The apparatus of claim 16, wherein the plurality of uplink-downlink configurations include 3GPP TS 36.211 uplink-downlink (UL-DL) configurations 0, 1, and 2.

18. The apparatus of claim 15, wherein a TDD configuration preference, of the TDD configuration preferences, is received via a parameter of a registration message during spectrum access system (SAS) registration or coexistence manager (CxM) registration.

19. The apparatus of claim 15, wherein each TDD configuration preference, of the TDD configuration preferences, identifies a common TDD configuration; and
wherein the selected TDD configuration is the common TDD configuration.

20. The apparatus of claim 15, wherein two or more TDD configuration preferences, of the TDD configuration preferences, do not identify a common TDD configuration; and
wherein the selected TDD configuration is a compromise TDD configuration.

21. The apparatus of claim 20, wherein the compromise TDD configuration is determined based at least in part on an average of uplink/downlink (UL:DL) ratios of the TDD configuration preferences.

22. The apparatus of claim 21, wherein the compromise TDD configuration is associated with an UL:DL ratio closest, of the plurality of possible TDD configurations, to the average.

23. The apparatus of claim 20, wherein the selection information identifies the compromise TDD configuration associated with a first primary channel allocation for a citizens broadband service device (CBSD) and a TDD configuration preference initially indicated by the CBSD, of the plurality of possible TDD configurations and determined based at least in part on the TDD configuration preferences, associated with a second primary channel allocation for the CBSD.

24. The apparatus of claim 15, wherein the guard band for the primary channel is determined based at least in part on the selected TDD configuration and the separation metric.

25. An apparatus for wireless communication, comprising:
means for receiving, for a citizens broadband radio service (CBRS) band, time division duplex (TDD) configuration preferences;
means for selecting, based at least in part on the TDD configuration preferences, a TDD configuration, from a plurality of possible TDD configurations; and
means for transmitting selection information identifying the selected TDD configuration,
wherein a transmission power reduction or a guard band for a primary channel, assigned for a citizens broadband service device (CBSD) of the CBRS band, is determined based at least in part on the selected TDD configuration and a separation metric.

26. The apparatus of claim 25, wherein the plurality of possible TDD configurations include a plurality of uplink-downlink configurations.

27. The apparatus of claim 26, wherein the plurality of uplink-downlink configurations include 3GPP TS 36.211 uplink-downlink (UL-DL) configurations 0, 1, and 2.

28. The apparatus of claim 25, wherein a TDD configuration preference, of the TDD configuration preferences, is received via a parameter of a registration message during spectrum access system (SAS) registration or coexistence manager (CxM) registration.

29. The apparatus of claim 25, wherein each TDD configuration preference, of the TDD configuration preferences, identifies a common TDD configuration; and
wherein the selected TDD configuration is the common TDD configuration.

30. The apparatus of claim 25, wherein two or more TDD configuration preferences, of the TDD configuration preferences, do not identify a common TDD configuration; and
wherein the selected TDD configuration is a compromise TDD configuration.

31. The apparatus of claim 30, wherein the compromise TDD configuration is determined based at least in part on an average of uplink/downlink (UL:DL) ratios of the TDD configuration preferences.

32. The apparatus of claim 31, wherein the compromise TDD configuration is associated with an UL:DL ratio closest, of the plurality of possible TDD configurations, to the average.

33. The apparatus of claim 30, wherein the selection information identifies the compromise TDD configuration associated with a first primary channel allocation for a citizens broadband service device (CBSD) and a TDD configuration preference initially indicated by the CBSD, of the plurality of possible TDD configurations and determined based at least in part on the TDD configuration preferences, associated with a second primary channel allocation for the CBSD.

34. The apparatus of claim 25, wherein the guard band for the primary channel is determined based at least in part on the selected TDD configuration and the separation metric.

35. A non-transitory computer-readable medium storing computer executable code for wireless communication, comprising code for:
receiving, for a citizens broadband radio service (CBRS) band, time division duplex (TDD) configuration preferences;

selecting, based at least in part on the TDD configuration preferences, a TDD configuration, from a plurality of possible TDD configurations; and transmitting selection information identifying the selected TDD configuration, wherein a transmission power reduction or a guard band for a primary channel, assigned for a citizens broadband service device (CBSD) of the CBRS band, is determined based at least in part on the selected TDD configuration and a separation metric.

36. The non-transitory computer-readable medium of claim 35, wherein the plurality of possible TDD configurations include a plurality of uplink-downlink configurations.

37. The non-transitory computer-readable medium of claim 36, wherein the plurality of uplink-downlink configurations include 3GPP TS 36.211 uplink-downlink (UL-DL) configurations 0, 1, and 2.

38. The non-transitory computer-readable medium of claim 35, wherein a TDD configuration preference, of the TDD configuration preferences, is received via a parameter of a registration message during spectrum access system (SAS) registration or coexistence manager (CxM) registration.

39. The non-transitory computer-readable medium of claim 35, wherein each TDD configuration preference, of the TDD configuration preferences, identifies a common TDD configuration; and wherein the selected TDD configuration is the common TDD configuration.

40. The non-transitory computer-readable medium of claim 35, wherein two or more TDD configuration preferences, of the TDD configuration preferences, do not identify a common TDD configuration; and wherein the selected TDD configuration is a compromise TDD configuration.

41. The non-transitory computer-readable medium of claim 40, wherein the compromise TDD configuration is determined based at least in part on an average of uplink/downlink (UL:DL) ratios of the TDD configuration preferences.

42. The non-transitory computer-readable medium of claim 41, wherein the compromise TDD configuration is associated with an UL:DL ratio closest, of the plurality of possible TDD configurations, to the average.

43. The non-transitory computer-readable medium of claim 40, wherein the selection information identifies the compromise TDD configuration associated with a first primary channel allocation for a citizens broadband service device (CBSD) and a TDD configuration preference initially indicated by the CBSD, of the plurality of possible TDD configurations and determined based at least in part on the TDD configuration preferences, associated with a second primary channel allocation for the CBSD.

44. The non-transitory computer-readable medium of claim 35, wherein the guard band for the primary channel is determined based at least in part on the selected TDD configuration and the separation metric.

* * * * *